United States Patent [19]
Cattaneo

[11] 3,967,005
[45] June 29, 1976

[54] METHOD FOR ENVELOPING PELLETS OF FOAMED POLY-STYRENE SUITABLE FOR PRODUCING LIGHTENED MANUFACTURED ARTICLES OF CEMENT

[76] Inventor: Mario Cattaneo, Via Simpione, 6, Bergamo, Italy, 24100

[22] Filed: Dec. 11, 1974

[21] Appl. No.: 531,604

[30] Foreign Application Priority Data
Dec. 14, 1973    Italy.................................. 3012/73

[52] U.S. Cl................................ 427/202; 427/214; 427/222; 427/385; 118/303; 428/407
[51] Int. Cl.²....................................... C04B 31/44
[58] Field of Search.................... 427/222, 202, 214; 118/303; 428/407

[56] References Cited
UNITED STATES PATENTS

| | | | |
|---|---|---|---|
| 2,631,355 | 3/1953 | Craig............................ | 118/303 UX |
| 3,130,070 | 4/1964 | Potters et al..................... | 118/303 X |
| 3,640,787 | 2/1972 | Heller............................. | 428/407 X |

FOREIGN PATENTS OR APPLICATIONS

| | | | |
|---|---|---|---|
| 7,138,717 | 11/1971 | Japan.................................. | 427/222 |

OTHER PUBLICATIONS
Chem. Abstracts, 78:7341f, (1973).

*Primary Examiner*—Ralph S. Kendall

[57] ABSTRACT

Method and related means for enveloping pellets of foamed polystyrene suitable for producing lightened manufactured articles of cement, wherein the pellets are introduced into a mixing unit at a first station thereof and then passed to a station for water and synthetic resin introduction, and next to a third station in said mixing unit where an inert filler is introduced, then reaching a heating zone for drying and polymerizing the enveloped pellets, said processing steps being carried out in a continuous succession.

5 Claims, 4 Drawing Figures

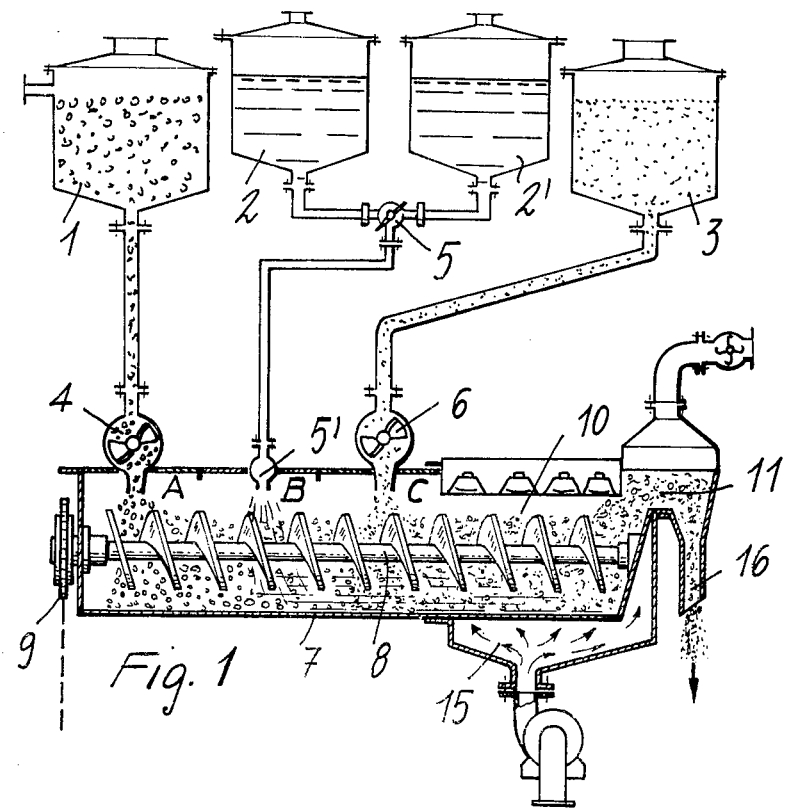
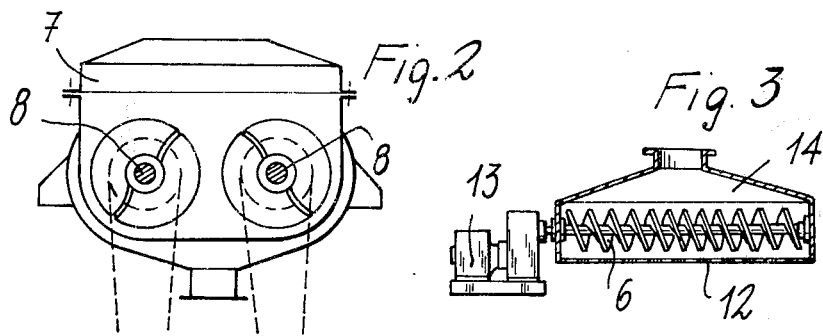

METHOD FOR ENVELOPING PELLETS OF FOAMED POLY-STYRENE SUITABLE FOR PRODUCING LIGHTENED MANUFACTURED ARTICLES OF CEMENT

This invention relates to a method for enveloping pellets of foamed polystyrene suitable for producing lightened manufactured articles of cement, and is also concerned with a particularly inexpensive formulation for use with the method according to the invention, as well as means for carrying out such a method.

As well known, in the production of cement manufactured articles, when desiring to provide a lightened product, such as a product also exhibiting very good properties of heat and sound insulation, besides other known products, resort is also had to incorporating into the manufactured article pellets of foamed polystyrene which have been previously enveloped or coated with a layer of synthetic resins.

One of the known methods for previously enveloping such pellets contemplates that the pellets should be introduced into a tank fitted with stirrer, along with amounts of expensive epoxy resins and cement or lime. Thus, at the tank outlet a wet product is obtained, in which the resin coating the pellet body is not polymerized, thus giving then rise in the course of storage or further transportation to building up of pellet crumbs and masses which are detrimental to the cement manufactured article when such pellets are incorporated into the manufactured article.

Instead of epoxy resins, use was already made for a gluing agent or adhesive of the type as used in farming for causing anticryptogamics or fungicides to adhere to the leaves. However, these and other gluing products are at least partially water soluble due to polymerization lack of the resins, so that when the enveloped or coated polystyrene pellets are contacted with water during the manufactured article production, the envelope or coating would tend to become separated, bringing (as a washing) the pellets back to the initial state thereof, thus providing a product of poor quality.

Upon designing and planning, it was found that cement or lime in the enveloping layer would chemically react in the presence of water and various chemicals used, so that cement or lime in the enveloping layer would "decay" and therefore also tend to cause the cement or lime arranged about the pellets "to decay" when introduced into the manufactured article, whereby the strength of the finished manufactured article would be highly adversely affected.

Finally, it should be noted that all of the heretofore enveloping proceses known suffer from the disadvantage of being discontinuous, that is a fixed predetermined amount of polystyrene pellets, resins and cement or lime is time by time introduced into the processing tank, and for availability of the enveloped pellets it is necessary to wait that the whole loaded volume or mass be processed and unloaded. This is a disadvantage when such a preparation is carried out directly at the use site, since the systems downstream of the processing station operate at a much higher and continuous rate and hence, in order to incorporate the pellets into a manufactured article, a shutdown for the systems and workers would become necessary for quite extended periods of time with attendant antieconomical dead times. As a further disadvantage, the lack should be mentioned of a proper and fast drying with polymerization in order to allow for a later use of the enveloped product.

It is the object of the present invention to provide a method, means for carrying out such a method, and a formulation for use with the method according to the invention, which can be readily, continuously, simply and economically carried into effect, at the same time enabling to overcome the attendant disadvantages of the prior art.

According to the invention, this is accomplished by a method for the above objects, characterized by substantially comprising the following continuous steps of introducing into a mixing unit a continuous stream of foamed polystyrene pellets and feeding these pellets to a further location of the mixing unit, where the introduction is provided for a likewise continuous metered and proportioned amount of water and synthetic resins, and feeding such wet pellets to a second location or station of the mixing unit where an inert filler is likewise continuously introduced at a metered proportioned amount, and then further feeding all of the introduced materials to a further station of said unit, where the material is dried and polymerized.

A further feature according to the invention resides in that the means for carrying out the method preferably comprise, as a mixing unit, a double-cylinder body, which is open at the connection center and provided with rotating vane conveyors, in which the introduction of water along with the resins and the introduction of the inert filler is transversely of the material feeding axis throughout the respective transverse extension of the feed unit at the respective introduction locations.

A further feature according to the invention resides in that, along with the polystyrene pellets, water with resins and inert filler are used for envelopment thereof instead of cement or lime, as used in known techniques. Particularly, as resins, it is provided by the invention the use of vinyl resins of a low cost and added with a complexing synthetic reactant to aid in dispersing the resin in water and reducing the percentage of required water.

These and further objects, features, details and advantages of the method, as well as means and formulation according to the present invention will become more apparent from the following short detailed description as given in connection with means according to the invention and by way of not limiting example, reference being had to the accompanying drawings in which:

FIG. 1 is a diagrammatic full view of the unit for carrying out the enveloping method according to the invention;

FIG. 2 is an end view showing the mixing unit (doubleshaft mixer) of FIG. 1;

FIG. 3 is a view showing a detail of the inert filler introducing unit of FIG. 1.

Figure 4:
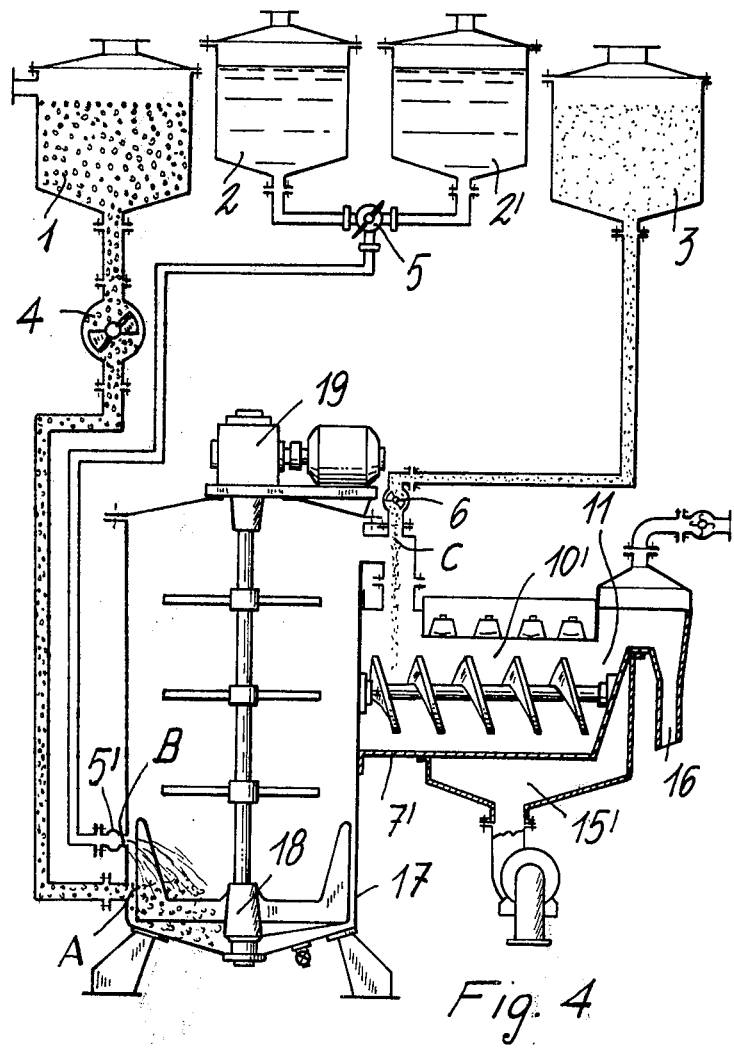
FIG. 4 is a view showing a modified embodiment of FIG. 1, where the mixing unit comprises a first vertically arranged length or section.

Referring to the drawings and particularly to FIGS. 1, 2 and 3, reference numeral 1 designates a tank for foamed polystyrene pellets intended to be enveloped, and reference numerals 2 and 2' designate tanks for water and synthetic resin mixing, such tanks being provided as two units just for imparting continuity to the process even when one of the tanks is empty. Thus, to this end, should the tank 2 be already empty and while providing for refilling the same, the selection tap 5 would be also automatically turned on to enable a flow from tank 2', whereas reference numeral 5' designates a pump for spraying the resinated liquid. A tank for the inert filler intended to partake to the enveloping process is shown at 3. The foamed polystyrene pellets, the water-resin mixture and the inert filler are supplied to a mixer 7 at the locations or stations A, B and C, respectively. Preferably, the mixer 7 is a tubular body internally including two counter-rotating vane shafts 8 for conveying the material being introduced.

At its area downstream of the material introduction locations, said mixing unit 7 comprises a heated drying length or section 10, as better described in the following. The outlet end of this unit 7 then terminates with a rise or protrusion 11 serving as a momentary obstacle to the pellets which, in order to be moved out, should accumulate and overcome such an obstacle, thus remaining for a longer period in the drying zone, the latter being provided with an overhanging hood for condensate suction or drawing.

The introduction of the polystyrene pellets at the station A can be either by gravity, or by a conveyor or screw of variable speed for amount metering. This capability has been diagrammatically shown at 4, where a variable speed screw metering device is shown.

The foamed polystyrene pellets thus introduced into the mixing unit 7, upon the rotation of the counter-rotating shafts 8 as suitably driven by a drive unit 7 connected to a control unit also of the variable speed type, are caused by the rotation of the vanes on said shafts 8 to move rightwards, as seen in FIG. 1, and hence will arrive at beneath the station B, where the mixture of water and synthetic resins is introduced by means of said pump 5'.

Water introduction is through a transverse tube fitted with nozzles to the direction of the pellet movement, so as to aid in homogeneously wetting the same. The distribution device, which will be provided with a metering tap, can be of any convenient design, such as a rain-like or even an atomizing type of distributor. On further forward moving, the so wetted pellets pass beneath the station C, where the inert filler is introduced by the metering device 6. As better shown in FIG. 3, thus metering device 6 substantially comprises a screw for metering provided with a variable speed geared motor 13, this screw being internally fitted with a tubular or box-like element 14, the bottom of which has a transversely arranged hopper opening 12.

The whole of the materials as respectively introduced into said stations A, B and C, that is the now enveloped pellets, arrive at a heating zone 10, where the material is thoroughly dried, so that the outlet product is quite dry. Drying within zone 10 can occur by hot air injection, with the jacket of the double-shaft mixer being heated and infrared ray elements (the provision of infrared rays is prevailing for a ready polymerization of the resins), or other like combinations. On moving to the outlet 16, the material will encounter said obstacle 11, and hence before coming out it has to accumulate in order to overcome said obstacle, this enabling to extend the dwell time within the drying zone 10 plus said steam sucking hood.

Referring to FIG. 4, a variant to FIG. 1 will now be described. In this figure, the same or like parts are designated by the same reference numerals, in the case followed by a prime. With respect to the embodiment of FIG. 1, the difference resides in that the first length or section 7 of FIG. 1, here denoted by 7', comprises a vertical length of section 17 substantially appearing as a tubular tower, within which the polystyrene pellets and water-resin mixture are introduced from the bottom at locations A and B, respectively. Through a vane shaft 18 driven by a geared motor 19, these materials move in upward direction through the tower 17 and then from the top to the horizontal length 7' of the mixing unit. The inert filler introduction is at C, just as described in FIG. 1. The same is true as to the heating and drying zone 10'.

As previously stated, the invention also provides a particular formulation for use with the method herein described. As above mentioned, the components being used for enveloping the pellets comprise a mixture of resins in water, as well as an inert filler, in place of cement or lime as used in conventional techniques. Particularly, the invention provides to use, instead of the expensive epoxy resins used in the prior art, such resins of a lower cost as vinyl resins suitably added with a complexing synthetic reactant to aid in resin dispersion in water. A good efficiency was found by using for each apparent cubic meter of foamed polystyrene pellets a mixture of "water" plus "resins" having the following composition:

| | |
|---|---|
| Water | 10 l. |
| Polyacetovinyl resin having a high degree of polymerization | 2 kg |
| Water retaining agent (methyl cellulose) (that is 0.1–0.2% on the resin amount) | 20–40 g |
| Creep inhibitor component (imparting roughness to the polystyrene pellets), weighting and not interferring with the action of the products being used (such as: Barium bioxide (ventilated) Diatomite (ventilated) Dolomite (ventilated) and the like (0.1–0.2% on the resin amount) | 20–40 g |

On tests carried out, it was found that the lightened cement manufactured article comprising pellets as enveloped by the above composition remarkably increases compressive and flexural strength in the manufactured article over that obtainable by the previously known techniques.

Although the method provides very good results with the above formulation, such a method could also be used with those resins as heretofore used, such as epoxy resins, since the material obtained at the end of the method according to the invention comprises previously dried enveloped pellets, which are therefore free of those disadvantages, such as building up of crumbs, accumulations and the like.

Of course, the invention is not limited to the details herein shown and/or described, but includes all of the variants and equivalent forms as devisable by those skilled in the art on the ground of the present invention.

What I claim is:

1. A method for enveloping foamed polystyrene pellets suitable for producing lightened manufactured articles of cement, the method substantially comprising the continuous steps of:
    introducing a stream of foamed polystyrene pellets into a mixing unit;
    feeding the pellets to a first station of said unit;
    continuously introducing at said first station a proportioned amount of water and water dispersible synthetic resins;
    feeding the so wetted pellets to a second station of said unit;

continuously introducing at said second station an inert filler in a proportioned amount;

feeding all of the material to a third station of said unit;

presenting an obstacle to the progression of material in said unit to cause momentary accumulation of said material at a drying and polymerization zone;

applying heat to the accumulated material at said zone to enhance drying and polymerization of said material; and thereafter delivering said material to an outlet of said unit.

2. A method as set forth in claim 1, wherein the pellets are first enveloped with a water dispersion of said resins, a proportioned amount of said inert filler being subsequently added thereto.

3. A method as set forth in claim 1, wherein said resins comprise vinyl resins.

4. A method as set forth in claim 3, wherein said water-dispersed vinyl resins are added with a complexing synthetic reactant to aid in dispersing the resins in water.

5. A method as set forth in claim 1, wherein the introduction of said foamed polystyrene pellets, mixture of water and resins, and inert filler is accomplished in a tubular mixing unit at separate stations thereof, the introduction for the mixture of water and resins, as well as the inert filler being carried out transversely of the feeding direction of said material in the mixing unit.

* * * * *